United States Patent
Godichon et al.

(10) Patent No.: US 10,408,060 B2
(45) Date of Patent: Sep. 10, 2019

(54) ROTATING MACHINE BLADE WITH REINFORCED MODULAR STRUCTURE

(71) Applicant: Howden Solyvent-Ventec, Meyzieu (FR)

(72) Inventors: Alain Godichon, Saint-Remuy (FR); Guy Constant Delaisse, Champforgeuil (FR)

(73) Assignee: HOWDEN SOLYVENT-VENTEC, Meyzieu (FR)

( * ) Notice: Subject to any disclaimer, the term of this patent is extended or adjusted under 35 U.S.C. 154(b) by 665 days.

(21) Appl. No.: 14/345,870

(22) PCT Filed: Sep. 21, 2012

(86) PCT No.: PCT/FR2012/052114
§ 371 (c)(1),
(2) Date: Mar. 19, 2014

(87) PCT Pub. No.: WO2013/041814
PCT Pub. Date: Mar. 28, 2013

(65) Prior Publication Data
US 2014/0227100 A1 Aug. 14, 2014

(30) Foreign Application Priority Data
Sep. 23, 2011 (FR) .................... 11 58525

(51) Int. Cl.
*F01D 5/14* (2006.01)
*F03B 3/12* (2006.01)
*F03D 1/06* (2006.01)

(52) U.S. Cl.
CPC ............... *F01D 5/147* (2013.01); *F03B 3/12* (2013.01); *F03B 3/126* (2013.01); *F03D 1/0675* (2013.01);
(Continued)

(58) Field of Classification Search
CPC ........ F01D 5/147; F03D 1/0683; F03D 3/126; Y02P 70/525; Y02P 70/523;
(Continued)

(56) References Cited

U.S. PATENT DOCUMENTS 2,362,301 A * 11/1944 Pecker .................. B64C 27/473
416/20 R
3,333,642 A    8/1967 Kee
(Continued)

FOREIGN PATENT DOCUMENTS

DE          1481671 A1   3/1969
EP          1965074 A2   9/2008
(Continued)

OTHER PUBLICATIONS

International Search Report dated Nov. 23, 2012 for PCT/FR2012/052114 filed Sep. 21, 2012.
(Continued)

*Primary Examiner* — Jessica Cahill
*Assistant Examiner* — Daphne M Barry
(74) *Attorney, Agent, or Firm* — Edell, Shapiro & Finnan, LLC

(57) ABSTRACT

The invention concerns a blade (1) designed to be fitted to the rotor of a rotating machine, said blade being characterized in that it exhibits a modular construction including: a rigid, median module (4) formed by a coffer (12), which is itself formed by joining two side panels (13, 14) that are connected to one another by at least one side rail (15), the side panels (13, 14) being connected by at least one weld executed on an internal protuberance on the said side panels that is set back from the intrados (11) and the extrados (1 E) of the blade (1), an upstream module (7) forming a leading edge and added onto the upstream portion of the median module, a downstream module (8) forming a trailing edge
(Continued)

Figure 4:
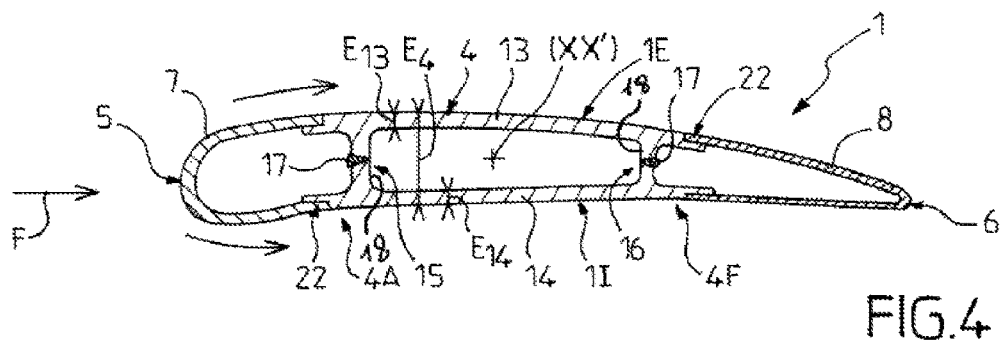

and added onto the downstream portion of the median module. Blades for rotating machines and corresponding fabrication methods.

20 Claims, 2 Drawing Sheets

(52) U.S. Cl.
CPC ...... *F03D 1/0683* (2013.01); *F05B 2230/232* (2013.01); *F05B 2230/60* (2013.01); *F05B 2240/301* (2013.01); *F05B 2240/302* (2013.01); *F05D 2230/232* (2013.01); *F05D 2230/51* (2013.01); *F05D 2230/60* (2013.01); *Y02E 10/223* (2013.01); *Y02E 10/721* (2013.01); *Y02P 70/523* (2015.11); *Y02P 70/525* (2015.11); *Y10T 29/49336* (2015.01)

(58) Field of Classification Search
CPC ......... Y10T 29/49336; F05D 2230/232; F05D 2230/60; F05D 2230/51; F05B 2230/60; Y02E 10/223; Y02E 10/721
See application file for complete search history.

(56) References Cited

U.S. PATENT DOCUMENTS

| | | | |
|---|---|---|---|
| 3,552,881 A | 1/1971 | Rogers et al. | |
| 3,736,638 A * | 6/1973 | Stone, Jr. | B21K 3/04 156/292 |
| 4,295,790 A * | 10/1981 | Eggert, Jr. | F03D 1/0675 416/226 |
| 4,643,646 A * | 2/1987 | Hahn | B64C 27/473 416/226 |
| 4,797,066 A * | 1/1989 | Stromberg | B63H 1/26 416/223 A |
| 4,976,587 A * | 12/1990 | Johnston | B64C 27/473 416/226 |
| 5,941,446 A * | 8/1999 | Yasui | B23K 20/02 228/157 |
| 6,155,783 A * | 12/2000 | Beyer | F03B 3/02 29/469.5 |
| 7,179,059 B2 * | 2/2007 | Sorensen | F03D 1/0675 416/226 |
| 7,503,752 B2 * | 3/2009 | Gunneskov | F03D 1/065 416/229 R |
| 7,891,947 B2 * | 2/2011 | Chen | F03D 1/0675 416/225 |
| 7,938,625 B2 * | 5/2011 | Dahl | B64D 45/02 29/889.7 |
| 8,038,407 B2 * | 10/2011 | Rao | F03D 1/0675 416/224 |
| 8,227,521 B2 * | 7/2012 | Jacobs | B29B 13/08 264/239 |
| 8,257,048 B2 * | 9/2012 | Yarbrough | F03D 1/065 244/123.8 |
| 8,262,361 B2 * | 9/2012 | Sanz Pascual | F03D 1/0675 416/226 |
| 8,454,318 B2 * | 6/2013 | Jensen | F03D 1/065 416/226 |
| 8,529,212 B2 * | 9/2013 | Smith | F04D 25/088 416/226 |
| 8,632,312 B2 * | 1/2014 | Jensen | F03D 1/0675 29/889.721 |
| 8,657,561 B2 * | 2/2014 | Buffone | B64C 3/48 415/12 |
| 8,657,581 B2 * | 2/2014 | Pilpel | F03D 3/062 415/4.1 |
| 8,678,324 B2 * | 3/2014 | Hemmelgarn | B64C 3/48 244/123.1 |
| 8,702,397 B2 * | 4/2014 | Babu | F03D 1/0675 416/226 |
| 8,961,143 B2 * | 2/2015 | Kulenkampff | B29C 65/52 29/889.71 |
| 9,759,183 B2 * | 9/2017 | Akhtar | F03D 1/0658 |
| 2010/0068065 A1 * | 3/2010 | Jensen | F03D 1/0641 416/241 R |
| 2010/0135815 A1 * | 6/2010 | Bagepalli | F03D 1/0675 416/226 |
| 2010/0143147 A1 | 6/2010 | Akhtar et al. | |
| 2011/0135485 A1 * | 6/2011 | Wang | F03D 1/0675 416/226 |
| 2011/0215585 A1 * | 9/2011 | Caires | F03D 1/0675 290/55 |
| 2012/0237351 A1 * | 9/2012 | Weisse | B64C 11/24 416/220 R |
| 2013/0171000 A1 * | 7/2013 | Masson | F01D 5/147 416/229 R |
| 2014/0070053 A1 * | 3/2014 | Kismarton | B64C 3/20 244/123.7 |

FOREIGN PATENT DOCUMENTS

| | | |
|---|---|---|
| EP | 2341239 A2 | 7/2011 |
| FR | 2459381 A1 | 1/1981 |
| WO | 01/46582 A2 | 6/2001 |

OTHER PUBLICATIONS

Preliminary Search Report and Written Opinion for French patent application FR 1761099 dated Apr. 19, 2018 with translation (12 pages).

* cited by examiner

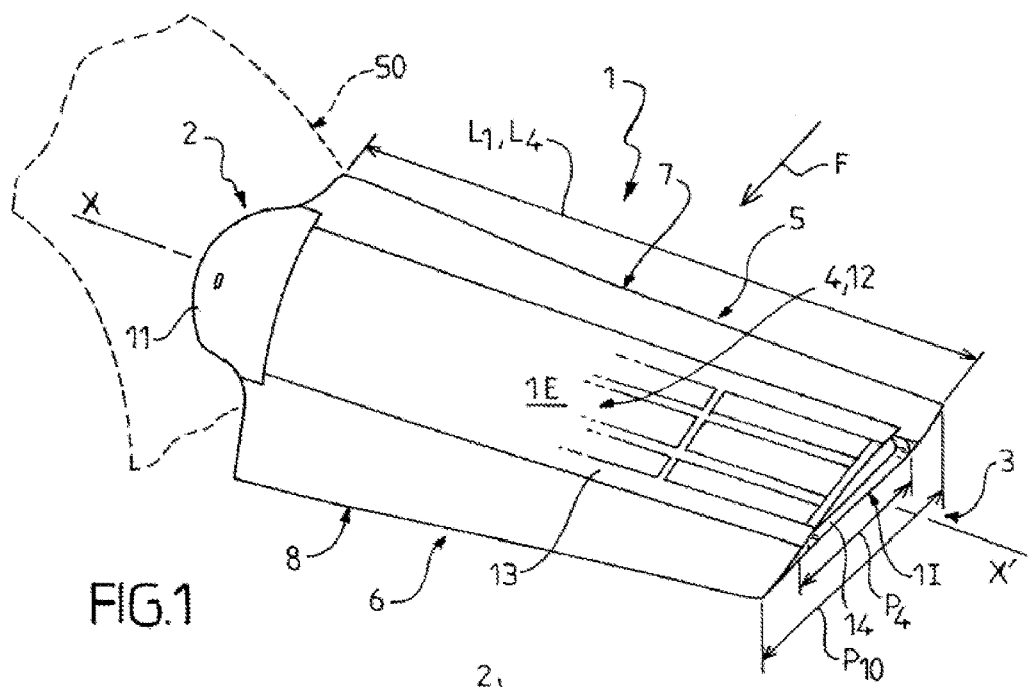
FIG.1
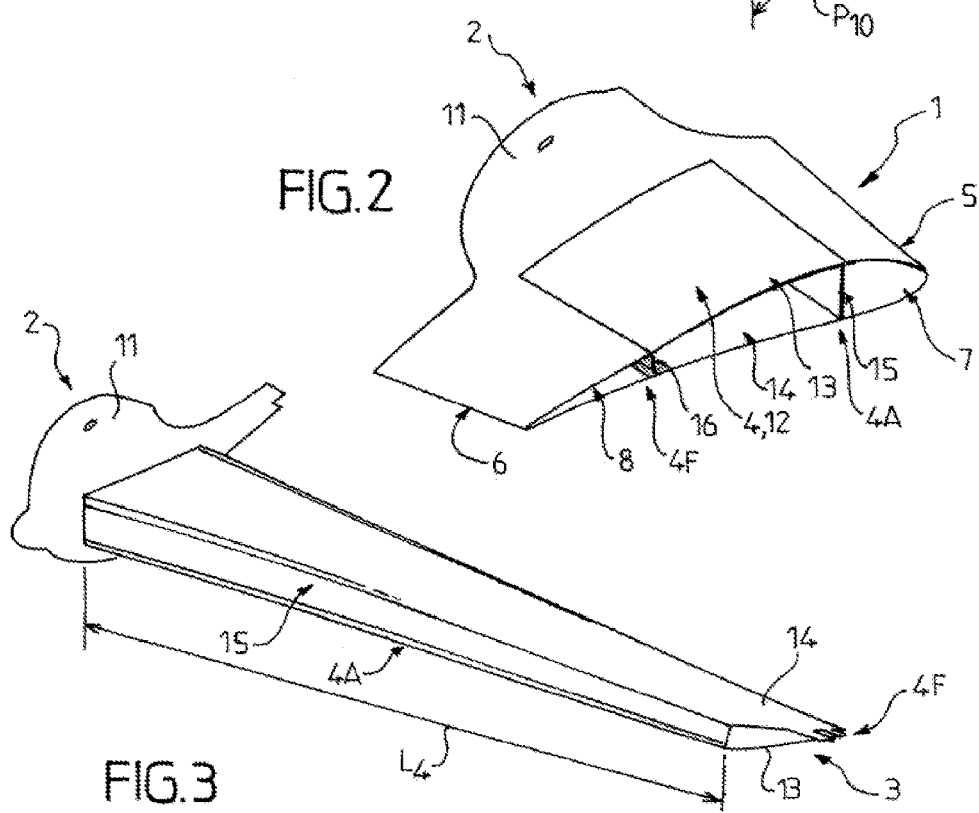
FIG.2
FIG.3

ROTATING MACHINE BLADE WITH REINFORCED MODULAR STRUCTURE

TECHNICAL FIELD

The present invention concerns the general technical field of blades fitted to rotating machines of the axial, turbine, wind, water, etc. type of fan, and relates more particularly to the construction of large-sized blades.

It concerns in particular, a blade designed to be fitted to the rotor of a rotating machine, a rotating machine fitted with such a blade, and also a fabrication method that allows the execution of such a blade.

PRIOR ART

In a well-known manner, rotating machines generally include at least one wheel that is made up of a hub linked to a shaft that is itself supported by means of bearings, and an assembly of blades fastened onto the said hub, generally at roughly equal angular intervals.

Such blades can be executed in various materials, the choice of which depends on the cost of execution as well as on the technical stresses to which the machine under consideration is exposed.

In particular, it is known to execute blades in a cast aluminum alloy when said blades are of small and medium size, that is, with a length (span) nor exceeding 2 meters.

Generally, if the blade has larger dimensions, it can be executed in a composite material, for example in a base of glass, carbon, or Kevlar® fibers incorporated into an epoxy-type resin.

Advantageously, such composite materials exhibit low density and good mechanical resistance.

However, their implementation can sometimes turn out to be relatively complex and costly.

In addition, composite structures can prove to be relatively vulnerable to impacts caused by particles or objects carried along in a fluid current and which circulate through the rotating machine. Therefore, maintenance and replacement of such elements can prove to be particularly difficult and burdensome.

Finally, the known blades may exhibit a certain tendency to vibrate under the effect of turbulence in the fluid flow, which can cause premature wear, or even rupture, due to fatigue.

DISCLOSURE OF THE INVENTION

The objects ascribed to the invention consequently aim to remedy the above-mentioned drawbacks and to propose a new blade for a rotating machine, which exhibits a particularly robust construction and which exhibits good fatigue resistance in the event of being subjected to vibrations, while still being easy to fabricate.

Another object ascribed to the invention aims to propose a new blade that is particularly adapted to large-sized machines.

Another object ascribed to the invention aims to propose a new blade that is less sensitive to deformation or vibration.

Another object ascribed to the invention aims to propose a new blade whose maintenance is simple and less costly.

Another object ascribed to the invention aims to propose a new, improved rotating machine, which exhibits a robust construction, is simple to assemble, and is less costly to service.

Another object ascribed to the invention aims to propose a new method of assembling blades designed for rotating machines, which is simple, rapid, and less burdensome to implement, particularly for maintenance requirements.

The objects ascribed to the invention are achieved with the aid of a blade designed to be fitted to the rotor of a rotating machine, said blade being characterized in that it exhibits a modular construction including:

a rigid, median module which extends radially from the root of the blade to the free end thereof, at some distance from the leading and trailing edges, said median module being formed by a coffer, which is itself formed by joining two side panels that are connected to one another by means of at least one side rail, the side panels being connected by at least one weld executed on an internal protuberance set back from the intrados and extrados of the blade, an upstream module forming a leading edge and added onto the upstream portion of the median module, a downstream module forming a trailing edge and added onto the downstream portion of the median module.

The objects ascribed to the invention are also achieved with the aid of a rotating machine of the turbine, fan, or wind type, which includes at least one blade according to the invention.

The objects ascribed to the invention are lastly achieved using a method of fabricating a modular blade for a rotating machine, said method including at least a module prefabrication step, in the course of which a rigid, median module, an upstream module designed to form a leading edge, and a downstream module designed to form a trailing edge are executed separately, with the step for fabricating the median module including the formation of a coffer by welding two metal side panels at the level of an internal protuberance on said side panels that is set back from the intrados and extrados of the blade.

DESCRIPTIVE SUMMARY OF THE DRAWINGS

Figure 5:
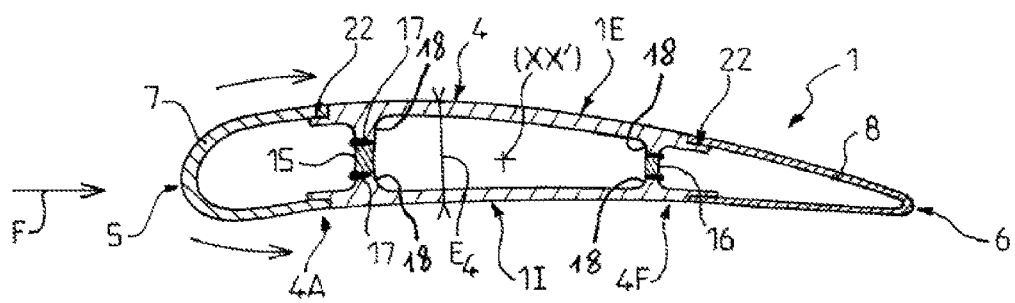
Figure 6:
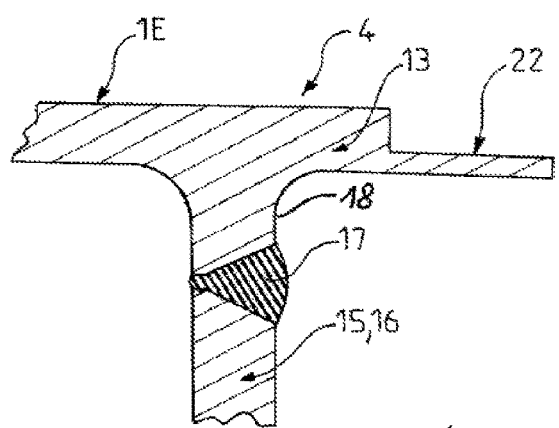
Figure 7:
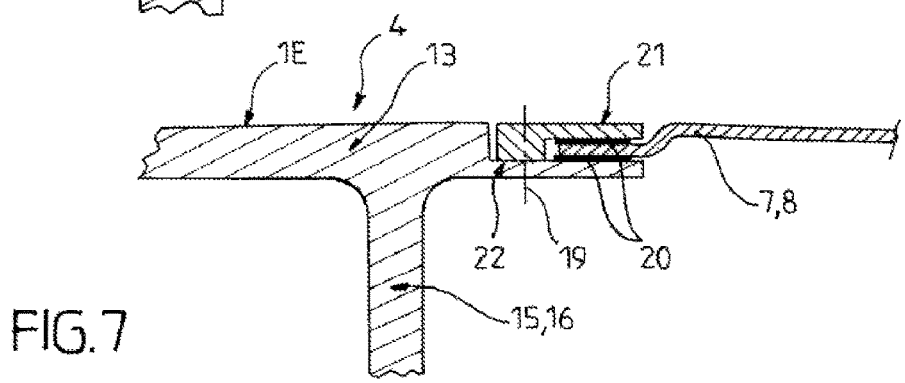

Other characteristic objects and advantages of the invention will appear in more detail upon reading the description that follows, as well as with the aid of the drawings appended, which are provided purely by way of non-limiting illustration, as:

FIG. 1, illustrating, in a perspective view, an example of a blade embodiment in keeping with the invention, FIG. 2, illustrating, in a perspective sectional view, the blade of FIG. 1, FIG. 3, illustrating, in a perspective view, the details of an embodiment example of a median module in keeping with the invention, FIGS. 4 and 5, illustrating, in views of a section normal to the generator axis of the blade, a first and a second embodiment variant of blade assemblies in keeping with the invention, FIG. 6, illustrating, in a detail view, an assembly example implemented within a median module in keeping with the invention, FIG. 7, illustrating, in a detail view, an assembly variant of an upstream or downstream module on a median module in keeping with the invention.

BEST WAY TO ACHIEVE THE INVENTION

The present invention concerns, generally, rotating machines designed to be carried along by, or on the other hand to carry along, a fluid in movement, such as, for instance, turbines and fans, particularly axial, wind, water, etc. turbines and fans.

In a known manner, such machines include a hub 50 (suggested by the dashes in FIG. 1), which is itself linked to a rotating shaft (not depicted) that can be supported by bearings.

At least one blade, and preferably a plurality of blades, 1, is/are fastened onto the said hub so as to be able to operate together with the fluid F that carries or is carried along by the rotating machine.

Each blade 1, designed to be fitted to the rotor of the said rotating machine, extends roughly radially, on the whole, along a generator axis (XX') from a root 2 located at the periphery of the hub 50 and at which said blade is attached to said hub, as far as an opposite end that forms a tip 3, located on the periphery of the wheel (or "rotor").

The length $L_1$ of the blade 1, measured roughly radially between root 2 and tip 3, is designated by "span".

In this respect, although the invention is in no way limited to a particular type or to particular dimensions of the rotating machine, it is noteworthy that the blade 1 will preferably be designed for large-sized machines, and for this purpose will be capable of exhibiting a span $L_1$ greater than or equal to 2 m, 3 m, 4 m, or 5 m, preferably between 2 m and 5 m, or it even able to go beyond 5 m.

The said blade will, in particular, be able to be adapted to support peripheral speeds in service, that is at tip 3, that can surpass 100 m/sec, or even attain or exceed 200 m/sec.

According to one important characteristic of the invention, as is seen particularly in FIGS. 1, 2, 4, and 5, blade 1 exhibits a modular construction that includes:

a median module 4, advantageously rigid, which extends radially from root 2 of blade 1 to the free end 3 thereof, at some distance from the leading edge 5 and the trailing edge 6, an upstream module 7 forming a leading edge and which is added onto the upstream portion 4A of the median module, a downstream module 8 forming a trailing edge 6 and which is added onto the downstream portion 4F of median module 4.

Advantageously, the blade 1 in keeping with the invention is thus obtained by joining and assembling modules 4, 7, 8, which are initially separate and distinct, whose median, intermediate module 4 is interposed between the upstream and downstream modules, which forms the core and the bearing element of said blade 1.

In a particularly preferential manner, one and/or the other of said central 4, upstream 7, and downstream 8 modules can be formed all in one piece in length, that is, going in the direction from root 2 to tip 3 of blade 1.

Advantageously, the construction in keeping with the invention allows great robustness and elevated and well-controlled rigidity to be conferred upon the blade 1, which permits a relatively elevated, natural resonance frequency to be obtained, while maintaining a relatively reduced mass.

In addition, such a modular construction allows for the simplified execution of different constituent elements of the blade and contributes to facilitating its assembly.

Preferably, median module 4, on the one hand, and the upstream 7 and/or downstream 8 module, on the other hand, will be able to be executed in distinct materials.

Thus, median module 4 will be able to be executed, for example, in a metallic material, of the steel or aluminum-alloy type, exhibiting a relatively elevated rigidity, while the upstream 7 and/or downstream 8 module will be able to be executed in lighter materials, less dense or thinner, if need be, for example, in the case of thin, stamped sheet metal, made of steel or aluminum alloy, or even in low-density composite materials obtained by molding, for instance.

In this respect, it is noteworthy that the modular make-up of the blade, and more particularly its segmentation into different modules 4, 7, 8 along its chord, allows the aerodynamic profile of the blade to be achieved in a piecewise manner. Such segmenting advantageously allows the execution of each piece to be simplified, and particularly the shaping of the respective material, while limiting loss of material and avoiding the use of complex tooling, even when the overall profile to be executed exhibits a particularly complex shape.

Preferably, the width $P_4$ of median module 4, measured along the chord 10 of blade 1, is greater than or equal to 20%, 25%, 30%, 40%, 50%, 60%, or even 75% of the length $P_{10}$ of said chord 10.

In other words, median module 4 takes up a significant distance (width), in an orthoradial plane of the blade normal to the generator axis (XX'), or even a majority of the distance (width) separating the leading edge 5 from the trailing edge 6, the upstream 7 and downstream 8 modules preferably forming principally the terminal sides of the said blade, side by side, roughly at the edges of median module 4.

In addition, the width $P_4$ of median module 4 is preferably, as the case may be, less than or equal to 80%, or even 70%, 60%, or 50% of the length $P_{10}$ of the chord of the blade.

As is illustrated in FIGS. 1 and 3, the length $L_4$ of median module 4, considered to be the generator axis (XX'), is, in turn, preferably greater than or equal to 40%, 50%, 60%, 75%, 80%, or 90% of the span $L_1$ of the blade, or is even roughly equal to the said span of the blade.

In other words, median module 4 preferably extends roughly over the majority or even the totality of the length of blade 1, considered radially between the root 2 and the tip 3 of said blade.

Advantageously, a median module 4 thus sized confers a particularly rigid framework upon the blade 1, which provides good rigidity, good mechanical resistance, and good stability for it over roughly its entire span $L_1$.

If need be, according to an embodiment variant not depicted, tip 3 of blade 1 will also be able to be formed by an end module, in a manner analogous to the leading 5 and trailing 6 edges, which module is added onto the radially external portion of median module 4 and whose length will be roughly complementary to that of median module 4, in order to reach span $L_1$.

The end module will possibly be able, if necessary, to be sandwiched between the upstream 7 and downstream 8 modules, or even, on the contrary, cover the latter in the manner of a crosspiece as well.

Thus, median module 4 will be able to form a central piece, even encased to some degree, protected by a flange edge that includes three peripheral modules (upstream, downstream, and end), each added onto one of the external sides of said median module 4, and more particularly on its edges. Of course, the characteristics, methods of assembly, technical purposes, and advantages associated with any one of the said peripheral modules covering median module 4 can hold true, mutatis mutandis, for the other peripheral modules.

In addition, median module 4 will be advantageously provided with means of fastening that allow it to be connected to the hub, either directly, for instance by bolting or welding, or by means of the intermediary of a specific base 11, forming a blade root, as is depicted particularly in FIGS.

2 and 3, said base 11 possibly being constructed to allow the multidirectional orientation of the blade about its principal generator axis (XX').

In addition, median module 4 is preferably at least visible in part, so as to form at least a part of the intrados 1I and/or extrados 1E of blade 1.

In other words, at least one, or even two, of the opposing external surfaces of median module 4 (here, the upper and lower sides in FIGS. 1, 2, 4, and 5) are preferably constructed to constitute a portion of the blade profile in contact with which the fluid F circulates, said surface being located in the median portion of said blade, in the extension of leading edge 5, and in front of the surface of trailing edge 6 so as to roughly ensure the continuity of the aerodynamic profile.

According to an important characteristic of the invention, median module 4 is formed by a coffer 12, thus allowing a hollow structure to be conferred on the median module, of the outline or girder type, the hollow preferably not filled in and the structure consequently lightweight, which nevertheless remains particularly resistant and rigid.

More particularly, the median module is formed by coffer 12, which is itself formed by joining two side panels 13, 14, preferably metal, each of which preferably extends all in one piece over the entire length of median module 4 and which are connected to one another by at least one side rail 15, and preferably, what is more, by two side rails 15, 16.

The said side panels will be able to be executed, for example, starting with metal sheets of a suitable thickness, possibly stamped and/or machined in order to confer upon them the profile and the desired thickness distribution.

The said side rails 15, 16 will advantageously be able to be formed by roughly flat, metal sheets or plates that connect the metal side panels 13, 14 in the manner of crosspieces, preferably roughly perpendicular to the side panels and preferably oriented roughly radially, which panels thus respectively form an upper, extrados side panel 13 and a lower, intrados side panel 14.

Preferably, at least one side rail 15 will be disposed at the upstream edge 4A of coffer 12 and the other 16 at the downstream edge 4F of said coffer.

As the case may be, and particularly depending on the thickness $E_4$ that must be conferred upon median module 4, one and/or the other of the side rails 15, 16 will be able to either be formed by an added intermediary piece connected to the side panels by its two opposite edges, as is illustrated in FIG. 5, or yet, according to an embodiment variant particularly matching FIG. 4, be able to match the join of two half-side rails, each made of the material of the side panel 13, 14 that corresponds it.

In both cases, side rails 15, 16 will be able to be initiated, or the half-side rails executed entirely, allowing for the internal protuberances 18 projecting from the principal plane of each side panel 13, 14 from the inside of the side panels, that is, into the blade thickness, opposite the extrados surface or corresponding intrados.

In particular, said side panels 13, 14 will be able to be machined for this purpose as a whole, leaving protuberances 18 to project, forming the bases of the side rails or the bodies of the half-side rails.

Preferably, the continuous link between the side panels, and more particularly between the side panels and their respective side rails, will be able to be achieved by welding, and this in a way that is exceptionally simple and economical.

Thus, advantageously, and according to an important characteristic of the invention, side panels 13, 14, preferably metal, are connected to one another directly or indirectly by the intermediary of a crosspiece formed by side rails 15, 16, by at least one weld 17 executed, for instance by a fillet weld or by spot welding, on an internal protuberance 18 of said side panels that is set back from the intrados 1I and the extrados 1E of blade 1. According to this assembly, side panels 13, 14 are connected to each side rail 15, 16 by at least one weld 17, which thus ensures the join between protuberances 18 and each side rail 15, 16 in a zone located at some distance from intrados 1I and extrados 1E.

In a particularly advantageous manner, such a disposition of welds 17 allows not only their number to be limited and their execution to be facilitated, while offering excellent accessibility to the welded parts, but in addition allows the welds to be disposed in a relatively protected zone set back from the visible exterior sides of the blade and inside the volume of coffer 12, which corresponds to a low-stress zone, including when the blade undergoes deformation when bending and particularly when it is likely to vibrate in its fundamental natural mode under the action of non-stationary pressures leading to high turbulence in the flow.

The patent holder has actually been able to make it virtually evident that, under the action of blade vibration in its fundamental mode, stress would be distributed in a specific manner over side rails 15, 16 of a median module 4 in keeping with the invention. It actually turns out that studying the stress distribution under the conditions defined above makes it evident that it is precisely in the median zones of side rails 15, 16, that is in the zones most distant from the intrados and extrados, that the stresses are low in blade 1, or even at their lowest. This particular feature makes obvious all the interest in placing the welds 17 in zones on the mechanical plane that are not, or very little, stressed, such that the welds 17 are very resistant to fatigue.

Thus, the assembly of median module 4 exhibits good robustness and in particular is not very sensitive to fatigue.

According to a preferential characteristic that can also fully constitute an invention, the walls of coffer 12, and more particularly side panels 13, 14 and side rails 15, 16, can also exhibit a variable thickness $E_{13}$, $E_{14}$, preferably decreasing, between root 2 of blade 1 and the free end 3 thereof.

For this purpose, side panels 13, 14 will in particular be able to be machined in sections, with a profile locally exhibiting a greater thickness in order to increase rigidity and reduce stresses caused, for instance, by the natural vibrations of the blade when rotating.

Of course, the variation in thickness, and more particularly the decrease in thickness, will be able to occur continuously or even be spread out radially in successive sections along the generator axis (XX'), however with the blade preferably exhibiting, on the whole, a root 2 that is stronger, thicker, and preferably with a more extensive surface area than its tip 3.

Preferably, the upstream 7 and/or downstream 8 modules will be exclusively borne by the median module and/or by the root of the blade.

In addition, the upstream 7 and/or the downstream 8 module will preferably be added onto median module 4, and more particularly onto coffer 12, by readily reversible assembly, such as screwing 19 and/or gluing 20, so as to be able, in particular, to be replaced without causing damage to median module 4.

More particularly, as is illustrated in FIG. 5, combining the screwing 19 and the gluing 20 will be able to be envisaged, while making use of a plated bracket 21, for instance, by screwing against a reinforcement or projection 22 of side panel 13, 14, which is designed to receive the matching free end of the upstream 7 or downstream 8 module that is disposed opposite the edge of coffer 12, said bracket 21 coming, on the one hand, to compress said end of the upstream or downstream module against side panel 13, 14 and, on the other hand, to reinforce the link obtained, while arranging one or two layers of adhesive between said upstream or downstream module, on the one hand, and the surface of side panel 13, 14 and/or that of bracket 21 on the other hand.

In addition, the upstream 7 and/or downstream 8 module will be able to be held radially, facing the centrifugal force developed when setting the blade into rotation, by means of at least one support piece (not depicted) joined to median module 4.

The said support piece will be able, for instance, to be of a shouldering or indentation type and to stand up in a direction roughly orthoradial to the principal direction of blade extension (XX'), said piece being able to be located, for instance, at roughly the level of root 2 in order to exert a restraint by means of traction, or even, on the contrary, roughly at the level of the tip 3 in order to keep the upstream and/or downstream module in compression.

Of course, a person skilled in the art will be able to adapt blade 1 in keeping with the invention when freely selecting or combining one or another of the above-mentioned characteristics, if need be.

Of course, the present invention also concerns the rotating machine as such provided with one or a plurality of blades 1 in keeping with the invention, preferably distributed equally on the rotor of said machine, as well as a method of assembling such a modular blade for a rotating machine.

More particularly, the said method will be able to include at least one step (a) for prefabricating modules, in the course of which are separately executed a rigid, median module 4, an upstream module 7 designed to form a leading edge 5, and a downstream module 8 designed to form a trailing edge 6, particularly with one or the other made of the above-mentioned materials and when one or the other uses the methods mentioned above, then an assembly step (b) in the course of which are joined, preferably by fastening that is readily reversible or disassembled, said modules 4, 7, 8, fastening the upstream module 7 onto the upstream portion 4A of median module 4 and the downstream module 8 onto the opposite downstream portion 4F of said median module 4, and more particularly onto the corresponding edges of coffer 12, so as to piece blade 1 together, placing the three modules roughly in succession facing the chord, on the extension of one and then the other.

Advantageously, in the course of the assembly step, the respective surfaces of the three modules are roughly aligned along the extension of one and then the other, so as to constitute an aerodynamic profile that is roughly continuous and smooth.

In this respect, as is illustrated in FIG. 5, the receiving ends of median module 4, like those of the upstream 7 and downstream 8 modules, will be able to advantageously exhibit projections 22 that allow for fitting and superposing different constituent elements of the join between the modules, while still retaining, on the whole, the visible external surfaces disposed on the extension of one and then the other.

The invention also concerns a method of fabricating a modular blade for a rotating machine, said method including at least one module-prefabrication step (a), in the course of which are executed separately a rigid, median module 4, an upstream 7 module designed to form a leading edge 5, and a downstream module 8 designed to form a trailing edge 6.

According to the invention, the step for fabricating the median module includes the formation of a coffer 12 by welding two side panels 13, 14, preferably metal, at the level of an internal protuberance 18 on said side panels that is set back from the intrados and extrados of the blade.

When welding the two side panels 13, 14 thus, which form the extrados and intrados respectively of median module 4 by means of a weld 17 extending some distance from the extrados, and from the extrados into a median zone that is very little or not at all stressed mechanically during vibrations, a median module 4 is thus obtained, in a very simple manner, which exhibits very good fatigue resistance.

Thus, the manner of constructing blades 1 in keeping with the invention exhibits numerous advantages, particularly when executing large-sized blades.

First of all, such a blade, and more particularly its metal construction, even when it exhibits a complex shape, on the whole, is relatively easy to assemble, with, if need be, a reduced number of welds.

Then, the construction of a metal coffer vehicle with controlled rigidity along the span of the blade and marrying the external surface thereof allows a fundamental natural blade frequency to be obtained that is higher than its bending mode, with reduced mass. It is, in addition, the same for the other natural modes of blade vibration.

Besides, the metal construction of the blade is executed with a reduced number of welds located in zones where alternating stresses will be low, particularly in the case in which the blade undergoes natural vibrations resulting from non-stationary aerodynamic forces to which it may be subjected occasionally, regularly, or even continuously. It is therefore particularly advantageous to obtain good fatigue behavior under this type of stress.

Finally, the construction of a metal coffer vehicle, preferably made of steel, ensures better behavior of the structure with respect to impacts to which the blade would be subjected due to particles, pieces, or objects transported in the fluid current, particularly when it involves foreign bodies penetrating accidentally into a current of fluid F, and particularly a high-velocity air current. Besides, if such impacts might still be harmful to the peripheral modules, which are perhaps those most exposed, and particularly to the upstream module forming the leading edge or even to a possible end module, this is of little consequence in practice, since these parts are executed at less cost in lightweight materials and can be easily replaced, at a cost much less than what replacing the entire blade would represent.

It is thus possible to obtain high longevity for the blade, and more, on the whole, for the rotating machine that uses it, at less expense, while preserving the rigid framework of the median module for a long time and only replacing the worn pieces relatively cheaply that make up the upstream and downstream modules, and the end module, if need be.

POSSIBILITY OF INDUSTRIAL APPLICATION

The invention finds industrial application in the fabrication of blades for rotating machines, particularly for industrial fans.

The invention claimed is:
1. A blade to be fitted on the rotor of a rotating machine, said blade having a modular construction, including:
   a rigid median module which extends radially from a root of the blade to a free end thereof, at a distance from the leading and trailing edges said median module being formed by a coffer, the coffer being formed by connecting an intrados side panel, which forms at least a portion of an intrados of the blade, and an extrados side panel, which forms at least a portion of an extrados of the blade, to one another by at least one weld formed on an integral internal protuberance of each of said side panels that is set back from the intrados and the extrados of the blade, each of the side panels and the corresponding integral internal protuberances are formed as a single uniform piece of metallic material;

an upstream module which forms a leading edge and is added onto an upstream portion of the median module; and a downstream module which forms a trailing edge and is added onto a downstream portion of the median module.

2. The blade according to claim 1, wherein the integral internal protuberance of each of the intrados and extrados side panels and the at least one weld connecting the integral internal protuberance of each of the intrados and extrados side panels form a side rail that connects the intrados side panel to the extrados side panel.

3. The blade according to claim 1, wherein a width of the median module measured along a chord of the blade is greater than or equal to 20% of the length of the chord of the blade.

4. The blade according to claim 1, wherein a length of the median module measured along a span of the blade is greater than or equal to 40% of the span of the blade, or is substantially equal to the span of the blade, wherein the span of the blade is measured between the root of the blade and the free end of the blade.

5. The blade according to claim 1, wherein walls of the coffer have a variable thickness which decreases between the root of the blade and the free end of the blade.

6. The blade according to claim 1, wherein the first material of the upstream module is made of a first material that differs from a second material of which the downstream module is made.

7. The blade according to claim 1, wherein at least one of the upstream module and the downstream module are removably coupled onto the median module so as to be able to be replaceable without damaging the median module.

8. The blade according to claim 1, further comprising a support piece joined to the median module for radially holding at least one of the upstream module and the downstream module.

9. The blade according to claim 1, wherein the blade has a span of greater than or equal to 2 meters, the span of the blade being measured between the root of the blade and the free end of the blade.

10. The blade according to claim 1, wherein a tip of the blade is formed by an end module coupled to a radially external portion of the median module.

11. A rotating machine of the turbine, fan, or wind type, including at least one blade according to claim 1.

12. The blade according to claim 1, wherein the intrados and extrados side panels include at least one projection at an end for receiving an end of one of the upstream module and the downstream module.

13. The blade according to claim 1, wherein the median module is configured to form at least a portion of a blade profile between the upstream module and the downstream module.

14. The blade according to claim 1, wherein receiving ends of the median module are configured to fit with respective receiving ends of the upstream module and the downstream module such that external surfaces of the median module are disposed between the upstream module and the downstream module.

15. The blade according to claim 1, wherein the intrados side panel and the extrados side panel are constructed of a steel or aluminum alloy.

16. A method for fabricating a modular blade for a rotating machine, said method including at least one module-prefabrication step, in the course of which are executed separately a rigid, median module, an upstream module designed to form a leading edge, and a downstream module designed to form a trailing edge, the step of fabricating the median module including the formation of a coffer by welding an intrados side panel, which forms at least a portion of an intrados of the blade, and an extrados side panel, which forms at least a portion of an extrados of the blade, to one another at a level of an integral internal protuberance on each of said side panels that is set back from the intrados and the extrados of the blade, wherein each of the side panels and the corresponding integral internal protuberances are formed as a single uniform piece of metallic material.

17. The method according to claim 16, wherein the integral internal protuberance of each of the intrados and extrados side panels and a weld, formed by the welding, connecting the integral internal protuberance of each of the intrados and extrados side panels form a side rail that connects the intrados side panel to the extrados side panel.

18. The method according to claim 16, wherein walls of the coffer have a variable thickness which decreases between a root of the blade and a free end of the blade.

19. The method according to claim 16, wherein the upstream module is formed from a first material and the downstream module is formed from a second material, the first material being different from a second material, and the first and second materials being different from the metallic material of the side panels.

20. The method according to claim 16, wherein the intrados and extrados side panels include at least one projection at an end for receiving an end of one of the upstream module and the downstream module.

* * * * *